US012701643B2

(12) United States Patent
Edwards

(10) Patent No.: US 12,701,643 B2
(45) Date of Patent: Aug. 4, 2026

(54) LIGHTING SYSTEMS AND METHODS

(71) Applicant: NBCUniversal Media, LLC, New York, NY (US)

(72) Inventor: Charles Edwards, Mesa, AZ (US)

(73) Assignee: NBCUniversal Media, LLC, New York, NY (US)

( * ) Notice: Subject to any disclaimer, the term of this patent is extended or adjusted under 35 U.S.C. 154(b) by 206 days.

(21) Appl. No.: 18/481,501

(22) Filed: Oct. 5, 2023

(65) Prior Publication Data

US 2024/0107642 A1 Mar. 28, 2024

Related U.S. Application Data

(63) Continuation of application No. 17/401,217, filed on Aug. 12, 2021, now Pat. No. 11,818,817.

(60) Provisional application No. 63/081,674, filed on Sep. 22, 2020.

(51) Int. Cl.
*H05B 45/22* (2020.01)
*H05B 47/165* (2020.01)

(52) U.S. Cl.
CPC ........... *H05B 45/22* (2020.01); *H05B 47/165* (2020.01)

(58) Field of Classification Search
CPC ...... H05B 45/22; H05B 47/165; H05B 45/20; G09G 3/3413
See application file for complete search history.

(56) References Cited

U.S. PATENT DOCUMENTS

2008/0094515 A1 4/2008 Gutta
2012/0013635 A1* 1/2012 Beeman .................. G09G 5/02 345/590
2014/0035465 A1* 2/2014 Raj .......................... G09G 3/30 315/151
2017/0039920 A1 2/2017 Li

FOREIGN PATENT DOCUMENTS

EP 2955711 A1 12/2015

OTHER PUBLICATIONS

Academy of Motion Picture Arts and Sciences, "Common LUT Format (CLF)—A Common File Format for Look-Up Tables," Mar. 30, 2020, 43 pgs, S-2014-006.
EP Communication; EP Application No. 201198133.7, dated Dec. 12, 2023; 6 pages.
EP Search Report; EP Application No. 201198133.7; mailed Feb. 14, 2022, 9 Pages.
European Communication Pursuant to Article 94(3) EPC; EP Application No. 21198133.7; dated Nov. 3, 2025.

* cited by examiner

*Primary Examiner* — Daniel D Chang
(74) *Attorney, Agent, or Firm* — Fletcher Yoder, P.C.

(57) ABSTRACT

A lighting system includes a controller having a processor and a memory. The processor is configured to receive an input indicative of a first set of lighting values corresponding to a first color space, map the first set of lighting values corresponding to the first color space to a second set of lighting values corresponding to a second color space, and output the second set of lighting values to a light emitting diode (LED) assembly.

18 Claims, 10 Drawing Sheets

122

LIGHTING SYSTEMS AND METHODS

CROSS-REFERENCE TO RELATED APPLICATIONS

This application is a continuation of U.S. patent application Ser. No. 17/401,217, entitled "LIGHTING SYSTEMS AND METHODS", filed Aug. 12, 2021, which claims priority from and the benefit of U.S. Provisional Patent Application Ser. No. 63/081,674, entitled "LIGHTING SYSTEMS AND METHODS", filed Sep. 22, 2020, each of which is hereby incorporated by reference in their entirety and for all purposes.

BACKGROUND

The disclosure relates generally to lighting systems and methods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Motion picture and television production includes a variety of digital technologies, such as digital cameras, digital backdrops, computer graphics, and digital workflows. Such technologies generally use a broad number of color systems to specify color images captured on set. For example, production images may include digital backdrops and computer graphics that specify a variety of color systems. Additionally, digital cameras may specify a variety of color systems, including some overlap with those specified for digital backdrops and computer graphics. Lighting in such production environments may typically be controlled manually by an operator based on the "look" of a production scene and without a specific standard shared across all lights on set, which may produce inaccurate lighting (e.g., lighting that does not match a given production scene). Further, film and television sets also use different lighting products, digital cameras, and/or digital displays that operate in different color systems or spaces with different color interpretations, requiring customized inputs and adjustments based on product and/or manufacturer. These inaccuracies mean that the lighting of a scene may often require manual adjustments in a post-production environment, which is time-intensive and requires extensive editing and processing of captured film or data. As such, a need exists to correlate the digital cameras, digital color lighting, and digital display on set.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a lighting system includes a controller having a processor and a memory. The processor is configured to receive an input indicative of a first set of lighting values corresponding to a first color space, map the first set of lighting values corresponding to the first color space to a second set of lighting values corresponding to a second color space, and output the second set of lighting values to a light emitting diode (LED) assembly.

In an embodiment, a method of controlling an LED assembly includes receiving an input indicative of a first set of lighting values corresponding to a first color space, mapping the first set of lighting values corresponding to the first color space to a second set of lighting values corresponding to a second color space, and outputting the second set of lighting values to the LED assembly.

In an embodiment, a lighting system includes a plurality of LED pixel assemblies and a controller having a processor and a memory. Each LED pixel assembly includes a plurality of LEDs configured to emit a color and a white color correlated temperature (CCT) and a reflector configured to direct light emitted by the plurality of LEDs. The processor is configured to receive an input indicative of a first set of lighting values corresponding to a first color space and map the first set of lighting values corresponding to the first color space to a second set of lighting values corresponding to a second color space. The second set of lighting values includes a particular color and a particular white CCT. The processor is also configured to output the second set of lighting values to the plurality of LED pixel assemblies. The second set of lighting values enables a lighting output of the lighting system to match the lighting output of a second lighting system having a second pre-configured color space that is different from a first pre-configured color space of the lighting system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
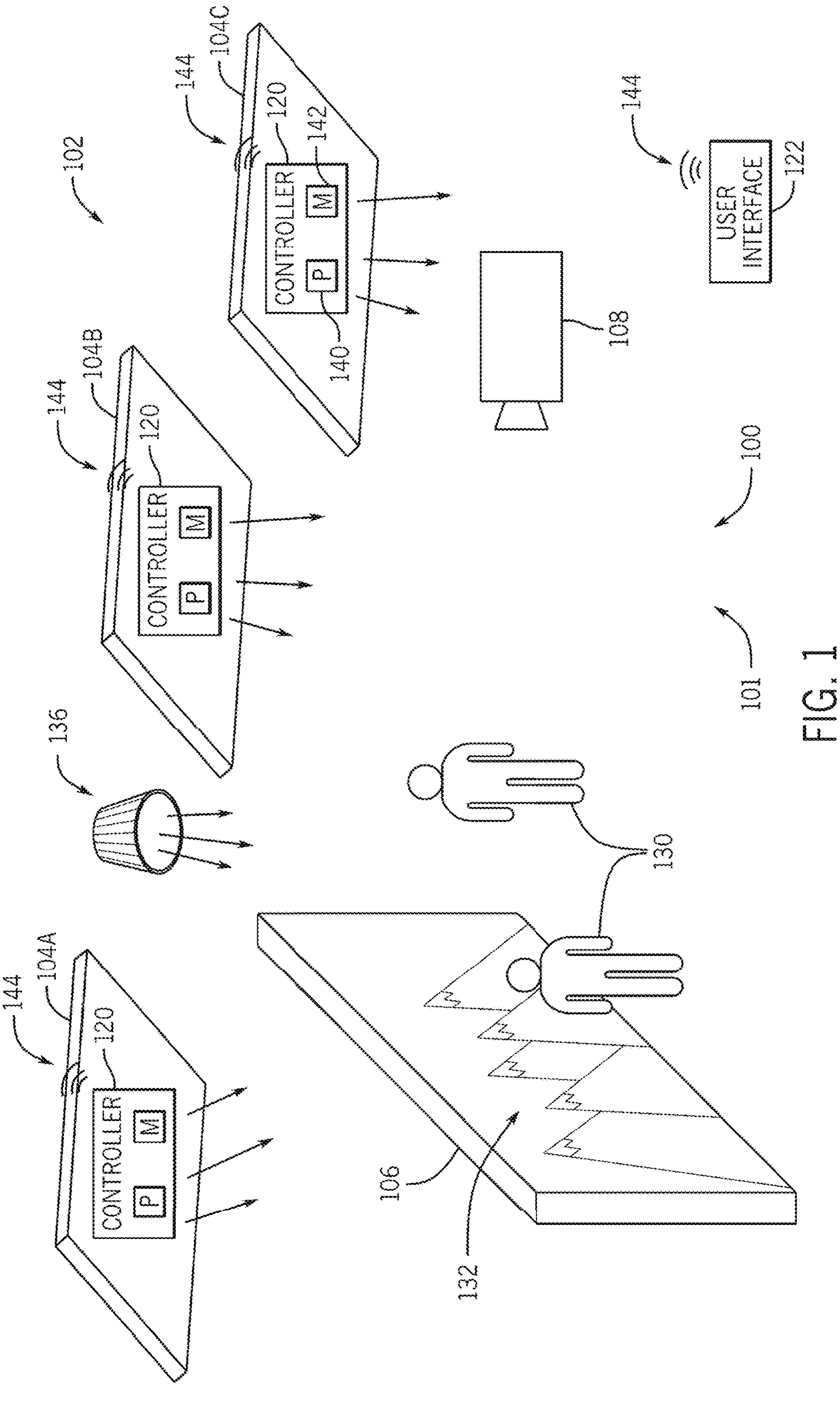
FIG. 1 is a perspective view of an embodiment of a set including a scene, a camera configured to capture images of the scene, and a lighting system including a lighting assembly configured to emit light onto the scene and a controller configured to control the lighting assembly, in accordance with one or more current embodiments.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Motion picture and television production continues to adopt more digital technologies as digital cameras, computer graphics, and digital workflows including color adjustment, such as grading and editing, become more prevalent. However, as more companies develop new digital products and new technologies for digital imaging, there are now a broad number of color systems used to specify color images captured on set, generated by computer or shown on digital displays. On set, digital color lighting in most cases is controlled separately and manually based on "look" without a specific standard shared across all lights. The process of calibrating colors on set is further complicated due to different light fixture manufacturers pre-configuring their devices with a different color space, and therefore, different lighting fixtures from different lighting manufacturers may operate within a different color space. As such, a need exists to develop products and techniques for improving lighting adjustments.

Also, in the past, the number of sources for digital color on set were limited. Usually the camera was the only digital imaging device. Lighting color was controlled by board ops manually. Green screen and blue screen were used to add special image effects later in post-production. However, more and more movie and episodic sets are merging digital content (LED Walls and displays) with the actors and "Hard Sets". Additionally, in broadcast television, LED displays are becoming common features on news and sports sets as virtual backgrounds that display content, graphics, and information real time. In these augmented reality environments, there is a need to correlate digital cameras, digital color lighting, and digital displays on set.

Turning now to the drawings, FIG. 1 is a perspective view of a set 100 that includes a scene 101 with people 130, a backdrop 106, a camera 108, and a lighting system 102. The lighting system 102 includes lighting assemblies 104 (e.g., LED assemblies) having controllers 120. The lighting assemblies 104 are configured to illuminate the scene 101, and the camera 108 is configured to capture images of the scene 101. In an aspect, each controller 120 may be configured to control operation of a respective lighting assembly 104, such that the operation of one or more lighting assemblies 104 is coordinated with other elements of the set 100 as more fully described below. In an aspect, some or all controllers 120 may communicate with a user interface 122 configured to enable user interaction with the lighting system 102 (e.g., interaction between an operator and the lighting system 102). A separate controller may be provided to control or to provide input to the backdrop 106 and/or the camera 108, or each of these devices may also be controlled by an independent controller. In some embodiments, a separate controller may communicate with and provide instructions to the lighting system 102 in addition to the backdrop 106 and/or the camera 108. In an aspect, the backdrop 106 may be an LED wall that includes one or more LED displays configured to display images or video content received from a video signal input. When the backdrop 106 is made up of multiple LED displays, the LED displays may be coordinated to display a single video such that each LED display shows a respective portion of the video.

As illustrated, the scene 101 includes the backdrop 106 and the people 130. In other embodiments, the scene 101 may include other objects, scenery, structures, animals, settings, or other features in place of or in addition to the backdrop 106 and/or the people 130 of the illustrated embodiment. Additionally, as illustrated, the backdrop 106 is displaying a landscape 132. In other embodiments, the backdrop 106 may display other objects, scenery, structures, animals, people, settings, landscapes, or other features in place of or in addition to the landscape 132 of the illustrated embodiment. In certain embodiments, the backdrop 106 and/or the camera 108 may be omitted from the set 100. In some embodiments, the lighting system 102 may include more or fewer lighting assemblies 104, such as one lighting assembly 104, two lighting assemblies 104, four lighting assemblies 104, eight lighting assemblies 104, twenty lighting assemblies 104, etc. The lighting assemblies 104 may be disposed spatially adjacent to one another, spatially apart from one another, parallel to one another, and/or at one or more angles relative to one another.

The camera 108 is configured to capture images of the scene 101, such as via still photography that captures still images, and/or via video photography that captures a collection of images (e.g., a video, a motion picture). For example, the scene 101 may be a scene for a motion picture, a television show, a video advertisement, a still image advertisement, an artistic image/video, and/or other suitable image/video production scenarios. As illustrated, the scene 101 includes the people 130 (e.g., actors and/or actresses) positioned in front of the backdrop 106. The backdrop 106 may display a particular setting for the scene 101 (e.g., the landscape 132 and/or other features), such that the people 130 appear to be positioned within and/or in front of the setting. In the illustrated embodiment, the people 130 may appear to be positioned within the landscape 132 in an image and/or video captured by the camera 108.

As discussed, the backdrop 106 may be a display device, such as a digital display configured to emit light to portray the setting. For example, the backdrop 106 may be an LED display configured to display images and/or videos. In certain embodiments, the light emitted by the backdrop 106 may be insufficient to illuminate the scene 101 (e.g., to illuminate the people 130 and other portions of the scene 101) or insufficient to cast the appropriate shadows in the scene 101, including on or around the people 130. Accordingly, the lighting system 102 (e.g., the lighting assemblies 104) may emit light toward the people 130 and illuminate the people 130 and/or the scene 101 generally. While the lighting system 102 may initially be pre-configured to output light in a first color space, light provided by the lighting system 102 may match the light output according to a second color space configured for the backdrop 106, where the second color space that is different from the first color space. In another aspect, the light provided by the lighting system 102 may depend on the setting provided via the backdrop 106 and/or may be based on the scene 101 generally. For example, the lighting system 102 may project light that generally mimics natural outdoor lighting (e.g., for an outdoor setting), indoor fluorescent lighting (e.g., for an indoor office setting), dim lighting (e.g., for an indoor restaurant setting), dynamic lighting with varying levels of brightness (e.g., for a dynamic scene with varying light levels, such as a car driving in a city at night), and other suitable lighting scenarios. In certain embodiments, lighting provided by the lighting system 102 may provide specific looks and/or may facilitate generation of computer-generated lighting effects. Additionally, as described in greater detail in reference to FIGS. 4 and 5, the lighting assemblies 104 may be LED assemblies configured to project light in a manner that enhances illumination of the scene 101 relative to traditional lighting sources.

The lighting provided by the lighting system 102 may depend on (mimic or be correlated with) the backdrop 106, the camera 108, other aspects of the lighting system 102, and/or other aspects of the scene 101 generally. As illustrated, the lighting system 102 includes lighting assemblies 104A, 104B, and 104C that may emit light corresponding to the backdrop 106, an alternative light source 136, and the camera 108, respectively. For example, light emitted by the lighting assembly 104A may correspond to and/or match the image/video displayed by the backdrop 106, light emitted by the lighting assembly 104B may correspond to and/or match lighting provided by the alternative light source 136, and/or light emitted by the lighting assembly 104C may correspond to and/or match an anticipated or planned lighting of an image/video captured by the camera 108. Further, the lighting emitted by the lighting assemblies 104A, 104B, and 104C may depend on a type of the backdrop 106, (e.g., a type of display), a type of the alternative light source 136, and/or a type of the camera 108, respectively. In certain embodiments, the lighting assembly 104A, the lighting assembly 104B, and/or the lighting assembly 104C may switch between components of the set 100. By way of example, each of the lighting assemblies 104A, 104B, and 104C may be controlled to emit light corresponding to the backdrop 106. In other embodiments, both the lighting assemblies 104A and 104B may be controlled to emit light corresponding to the camera 108, and the lighting assembly 104C may be controlled to emit light corresponding to the alternative light source 136. As described in greater detail below, the lighting assemblies 104A, 104B, and 104C may switch dynamically between such components of the set 100 (e.g., the backdrop 106, the camera 108, the alternative light source 136, and other components of the set 100) via lookup tables stored in the controllers 120 and/or in other suitable storage devices. Lookup tables may be referred to as "LUTs" herein. In this way, the lighting assembles 104 may use the same color control values as the backdrop 106 or the alternative light source 136 and output the same light, even though the lighting assemblies 104 may initially be configured to use a different color space than the color space of the backdrop 106 or the alternative light source 136. In addition, by calibrating the lighting assemblies 104 with the backdrop 106 (or the alternative light source 136), this enables the lighting assemblies 104 to receive the same video color/commands to be streamed to both devices simultaneously, enables the lighting assemblies 104 to be in sync with the video on the backdrop 106 (or with the alternative light source 136), and enables lighting fixtures with different color spaces to be color-matched and controlled by a single system.

The controllers 120 may be configured to control some or all aspects of the lighting system 102 (e.g., the lighting assemblies 104). For example, each controller 120 may control operation of the respective lighting assembly 104 based on a particular lighting scheme. As used herein, a "lighting scheme" may generally refer to a set of lighting values and/or one or more light levels to be projected by the lighting assembly 104. The set of lighting values may be specific to LED pixel assemblies of the lighting assembly 104. Additionally or alternatively, the set of lighting values may be in an ordered sequence, such that the light projected by the lighting assembly 104 changes over a given period of time. For illustration purposes, FIG. 1 depicts the controllers 120 as being included in the lighting assemblies 104, but some or all of the controllers 120 may also be separate from the lighting assemblies 104. Further, as described in reference to FIG. 7, a single controller 120 may be configured to control multiple lighting assemblies 104. For example, in the illustrated, embodiment, a single controller 120 may control each of the lighting assemblies 104A, 104B, and 104C.

Further, the lighting assemblies 104 may be controlled to automatically adapt to a color space of another device (e.g., the backdrop 106, the camera 108, the alternative light source 136, and/or another suitable device) and/or based on a color space of a received set of lighting values. As used herein, a "color space" generally refers to a set of lighting parameters that may be identified by a given lighting standard (e.g., CIE1931, Academy Color Encoding System (ACES), etc.) and/or specified for a given device. For example, certain displays may require and/or benefit from displaying images/videos in a particular color space. Certain cameras may require and/or benefit from capturing images/videos in a particular color space. Additionally, the color space may generally be a color space for other traditional lights used in a television/movie production environment. Such lighting parameters of a color space may include color values, brightness, intensity, white color correlated temperature (CCT), and/or other lighting parameters.

In certain embodiments, one or more controllers 120 may control respective lighting assemblies 104 after receiving a video signal, such as the same or a similar video signal provided to the backdrop 106. Such a video signal may cause the backdrop 106 to display a video including a static or dynamic setting for the scene 101. For example, the setting may include moving scenery that causes the people 130 to appear to be moving within the scene 101, or the setting may include generally static scenery (e.g., the landscape 132) with some moving aspects (e.g., birds, trees) that causes the people 130 to appear to be standing within the scenery. The same video signal may be provided to the lighting system 102, such that the video signal causes the lighting assembly 104 (e.g., the lighting assembly 104A, 104B, and/or 104C) to display the same video, a similar video, a version of the video, or a portion of the video relative to the backdrop 106. The video displayed by the lighting assembly 104 may be a lower resolution than the backdrop 106 and may provide lighting (e.g., illumination) for the scene 101 that generally matches the image(s) displayed by the backdrop 106, lighting provided by other lighting instruments, and other aspects of the scene 101. The controller 120 of the lighting assembly 104 may map a first set of lighting values identified in the video signal and in a first color space to a second set of lighting values in a second color space, such that LEDs of the lighting assembly 104 may emit the second set of lighting values in the second color space.

In some embodiments, one or more controllers 120 may control respective lighting assemblies 104 via other forms of automatic control, such as a control signal other than the video signal described above. The control signals (e.g., the video signals and the other control signals) may enable the lighting assemblies 104 to automatically project a desired set of lighting values onto the scene 101 and facilitate realistic illumination of the scene 101. In certain embodiments, the set of lighting values may be provided via manual input and/or may be modified manually by a user. Such manual input may be received via the user interface 122 and may be communicated to the lighting system 102 via digital multiplex (DMX) signals, remote device management (RDM) signals, Ethernet signals, wireless internet (WiFi) signals, Bluetooth signals, and/or cognitive radio multiplexer (CRMX) signals. In certain embodiments, the lighting system 102 may include the user interface 122 and/or a device configured to display the user interface 122, such as a mobile device, a personal computer, a laptop, a mixing board, and other suitable devices.

A particular set of lighting values may be selected by a user and/or may be modified by the user, such as via the user interface 122, which may include a graphical user interface (GUI) and/or physical controls, such as sliders, buttons, and/or other controllable features. Embodiments of the user interface 122 including a GUI are described in greater detail below in reference to FIGS. 7-9. The user interface 122 may be configured for entry and/or selection of each of the user inputs described herein, such as via a manual data entry field, a drop-down menu, and other suitable entry and/or selection fields. In some embodiments, the display may be a touch screen display configured to detect a user's touch/interaction. In certain embodiments, the user interface 122 may be communicatively coupled to the controllers 120, such that the controllers 120 may receive signals indicative of the user inputs and make determinations based on the inputs, such as a selected set of lighting values and/or adjustments to a set of lighting values. For example, as illustrated, the user interface may communicate with the controllers 120 via remote signals 144.

The lighting assemblies 104 may project a variety of sets of lighting values that simulate particular settings and/or lighting for a scene. In an embodiment, the scene may include a car driving under a bridge or through a tunnel. The set of lighting values may simulate movement of the car by initially having a relatively bright light projected by the lighting assemblies 104, having a relatively dim light while the car is positioned below the bridge, and changing back to a relatively bright light after the car emerged from below the bridge. In another embodiment, the scene may be outdoors during a day with some cloud cover. To simulate movement of the clouds, the set of lighting values may include dynamic light levels projected by the lighting assemblies 104. In some embodiments, the set of lighting values projected by the lighting assemblies 104 may be relatively static, such as to simulate indoor lighting, sunlight on a cloudless day, moonlight on a cloudless night, and other lighting scenarios.

A set of lighting values projected by the lighting assemblies 104 may offer significant advantages relative to traditional production lighting (e.g., Fresnel lights, carbon arcs, tungsten light bulbs, hydrargyrum medium-arc iodide (HMI) light bulbs, fluorescent lights). For example, the lighting assemblies 104 may be controlled digitally via the controllers 120, such that the light levels projected by the lighting assemblies 104 may change dynamically and on a frame-by-frame basis.

As described above and in greater detail in reference to FIG. 2, the lighting system 102 may be configured to convert a received input/signal, such as a video signal, into a set of lighting values for a particular color space that may be emitted by the lighting assemblies 104. For example, a received set of lighting values (e.g., a first set of lighting values or a first lighting scheme) may specify certain red, blue, and green values and may identify a first color space, such as a color space related to light emitted by the backdrop 106 and/or light captured by the camera 108. The lighting system 102, via the controllers 120, may determine an adjusted set of lighting values (e.g., a second set of lighting values or a second lighting scheme) based on the received set of lighting values and a second color space by referencing available lookup table(s). For example, each lookup table may store data mapping/converting a first set of lighting values in a first color space to a second set of lighting values in a second color space. The controllers 120 may determine the second set of lighting values based on and in response to receiving the first set of lighting values and the first color space.

Figure 3:
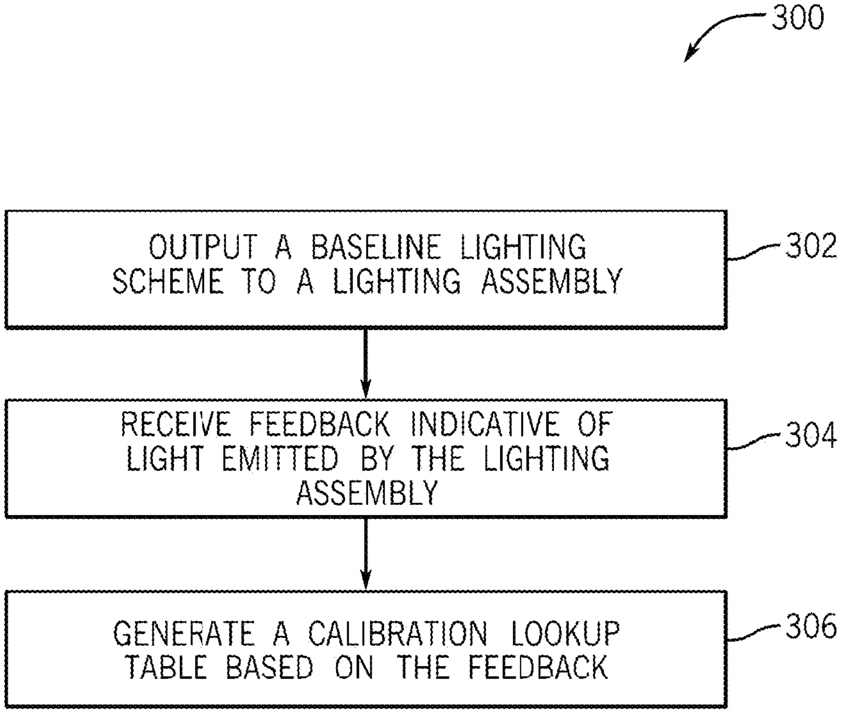
FIG. 3 is a flow diagram depicting an embodiment of a method for generating a calibration lookup table for the lighting assembly of FIG. 1, in accordance with one or more current embodiments.

In certain embodiments and as described in greater detail in reference to FIG. 3, the lighting assemblies 104 may be calibrated to facilitate accurate projection of a given set of lighting values. Such calibration may be performed during/after initial assembly of the lighting assemblies 104, during/after maintenance of the lighting assemblies 104, and/or during/after use of the lighting assemblies 104. Calibration of the lighting assemblies 104 may generally establish baseline levels of lighting (e.g., baseline lighting schemes) that may be projected by the lighting assemblies 104 in response to receiving a particular set of lighting values. More specifically, calibration of the lighting assemblies 104 may enable generation of a respective calibration lookup table for each respective lighting assembly 104. Each controller 120 may reference the respective calibration lookup table to generate a set of lighting values to be projected the respective lighting assembly 104. Accordingly, the calibration lookup tables may enable the lighting assemblies 104 to emit accurate representations of the set of lighting values.

Additionally, the controllers 120 may map the first set of lighting values to the second set of lighting values via multiple lookup tables. For example, the first set of lighting values in the first color space may initially be mapped to an intermediate set of lighting values in an intermediate color space via an intermediate lookup table that maps the first color space to the intermediate color space. The intermediate set of lighting values may be mapped to the second set of lighting values in the second color space via a lookup table that maps the intermediate color space to the second color space. Additionally, the second set of lighting values in the second color space may be mapped to a calibrated set of lighting values via the calibration lookup table. Accordingly, the controllers 120 may map the received set of lighting values to a set of lighting values to be emitted by the lighting assemblies 104 via multiple, chained lookup tables. Each controller 120 may store a library of such lookup tables and/or may reference an external library of lookup tables to perform the mapping steps.

The controllers 120 may include one or more processors (illustrated and referred to in this disclosure as a single processor 140 for each controller 120) and one or more memory or storage devices (illustrated and referred to in this disclosure as a single memory device 142 for each controller 120). The processor 140 may execute software programs and/or instructions stored in the memory device 142 that facilitate operation and control of the respective lighting assembly 104 and/or the lighting system 102 generally. Moreover, the processor 140 may include multiple microprocessors, one or more "general-purpose" microprocessors, one or more special-purpose microprocessors, and/or one or more application specific integrated circuits (ASICs). For example, the processor 140 may include one or more reduced instruction set computer (RISC) processors. The memory device 142 may store information such as control software, look up tables, configuration data, and so forth. The memory device 142 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium.

In certain embodiments, the controllers 120 may store metadata associated with received signals corresponding to components of the set 100 and/or a configuration of such components. The metadata may include mapping information identifying various lookup tables that may be referenced to convert received signals into a set of lighting values to be emitted by LEDs of the lighting assemblies 104. Such metadata may enable the lighting assemblies 104 to more efficiently identify the conversion and produce a desired lighting for the set 100. For example, the lighting may be provided by the lighting assemblies 104 during an initial shoot (e.g., take) of the scene 101, and metadata may be generated and stored during the initial shoot. Additional takes of the scene 101 may be completed thereafter, and the metadata may be referenced to determine/provide the lighting of the set 100 during the additional takes rather than searching and identifying the various lookup tables again. Accordingly, the metadata may save time during the additional takes.

Figure 2:
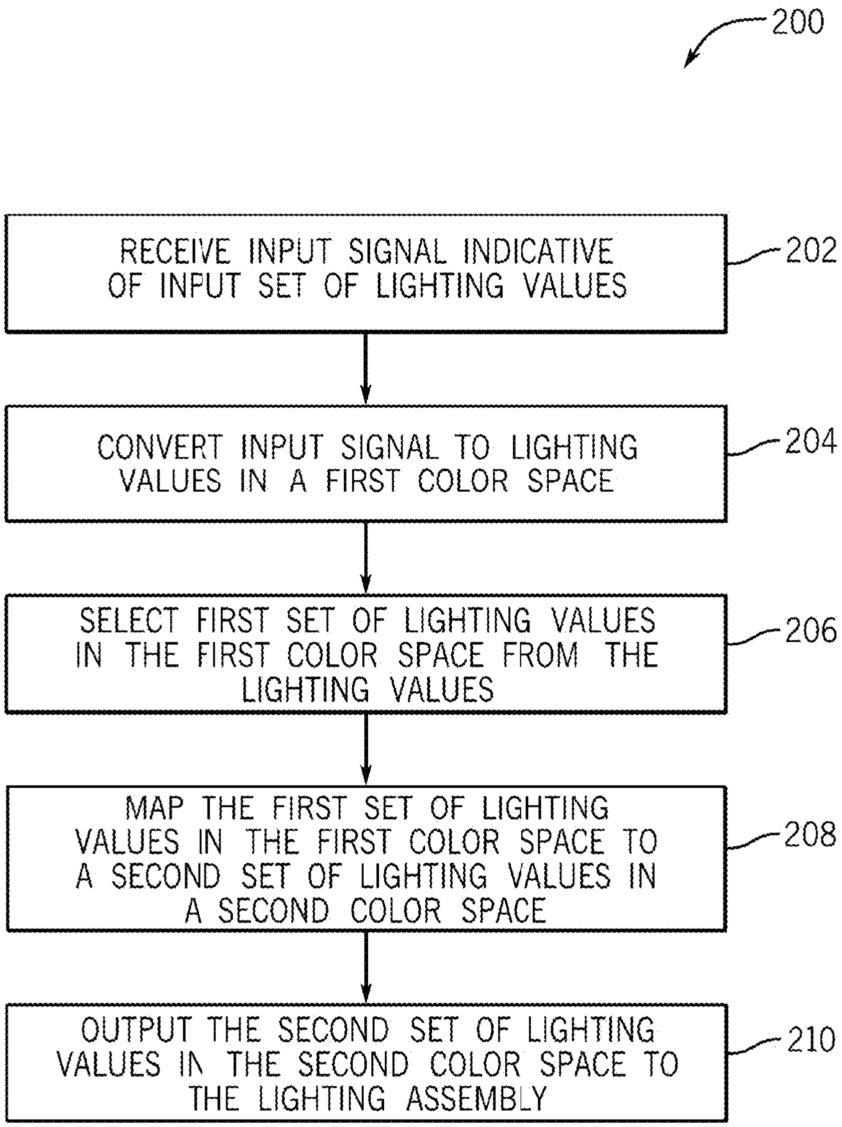
FIG. 2 is a flow diagram depicting an embodiment of a method for controlling the lighting assembly of FIG. 1, in accordance with one or more current embodiments.

With the preceding in mind, FIG. 2 is a flow diagram depicting an embodiment of a method 200 for controlling a respective lighting assembly 104 of FIG. 1. While the method 200 is described as being performed by the lighting system 102 for a single lighting assembly 104, the method 200 may be performed by the lighting system 102 for multiple lighting assemblies 104 (e.g., the lighting assembly 104A, 104B, and/or 104C). Additionally, the method 200 may be performed by any suitable system that may control the lighting assembly 104, such as the controller 120. While the method 200 is described using steps in a specific sequence, it should be understood that the present disclosure contemplates that the described steps may be performed in different sequences than the sequence illustrated, and certain described steps may be skipped or not performed altogether. In some embodiments, the method 200 may be implemented by executing instructions stored in a tangible, non-transitory, computer-readable medium, such as the memory device 142, using a processor, such as the processor 140. Further, while the method 200 is described within the context of RGBW (red, green, blue, white) color data, the method 200 is also applicable to other values such as HSIK (hue, saturation, intensity, temperature).

As illustrated, in block 202, the processor 140 receives an input signal indicative of an input set of lighting values, such as a video signal identifying a video sequence to be displayed by the backdrop 106, a set of lighting values generally matching the camera 108, a set of lighting values generally matching light projected by the alternative light source 136, and/or other suitable input sets of lighting values. The input signal may be a High-Definition Multimedia Interface (HDMI) signal indicative of a video sequence. The input signal may be received from the user interface 122 (e.g., via user selection) and/or may be received automatically based on a timed sequence of events. For example, the input set of lighting values may be implemented at a particular time within a given time sequence.

In some embodiments, the input signal may not include appropriate lighting values that may be mapped via lookup tables stored in the controller 120. Accordingly, in block 204, the processor 140 may convert the input signal to lighting values in a first color space that may be mapped via one or more lookup tables to lighting values in other color space(s). For example, the input signal may be a video signal such as an HDMI video signal, and the processor 140 may decode the video signal into RGB color data and/or a CCT value for each pixel (or one or more pixels). In some embodiments, the conversion may identify pixels within a given image, video, or pixel map that include each of the color data. The color space may be any suitable color space, such as CIE1931 or ACES. In certain embodiments, the input signal may include the red, green, and blue color data and the CCT, such that block 204 may be omitted.

In block 206, the processor 140 may select a first set of lighting values in the first color space from the lighting values in the first color space (e.g., the lighting values determined at block 204). More specifically, the processor 140 may select a subset of the lighting values identified in the red, green, and blue color data as the first set of lighting values in the first color space. The subset may depend on a desired resolution of lighting to be emitted by the lighting assembly 104, a size of the lighting assembly 104, a size and/or type of the lighting assembly 104 relative to other devices (e.g., the backdrop 106, the camera 108, the alternative light source 136), a type of the set 100, and/or a type of the scene 101. In some embodiments, the first set of lighting values may include all lighting values determined at block 204, or the first set of lighting values in the first color space may be identified in the input signal received at block 202, such that block 206 may be omitted. In other embodiments, the first set of lighting values may be a subset of the lighting values available from the input signal, and the first set of lighting values may be selected based on a pixel map identifying the pixels to be selected.

In block 208, the processor 140 generates a second set of lighting values for the lighting assembly 104 (e.g., an LED assembly), where the second set of lighting values is associated with a second color space and the first set of lighting values is associated with the first color space. In certain embodiments, the processor 140 may generate the second set of lighting values in response to receiving the first set of lighting values. The processor 140 may generate the second set of lighting values in the second color space by identifying a particular lookup table correlating the first color space to the second color space. For example, each set of two color spaces may have a particular lookup table, such as a lookup table stored in the memory 142 or in another suitable memory, and the processor 140 may identify the appropriate lookup table based on the set of two color spaces (e.g., the first color space and the second color space). As described herein, the first color space and/or the lookup table may correspond to a specific type of display (e.g., the backdrop 106), a specific type of camera (e.g., the camera 108), a specific type of another light source (e.g., the alternative light source 136), and/or other devices and objects of the set 100. In some embodiments, the input signal received by the processor 140 at block 202 may include the type of display, camera, and/or other light source, such that the processor 140 may determine the first color space and/or the appropriate lookup table based on the type of display, the type of camera, and/or the type of the other light source. After identifying the lookup table or receiving a user input selecting the lookup table, the processor 140 may identify the first set of lighting values within the first lookup table. The lookup table may correlate values of the first set of lighting values (e.g., red, green, blue, hue, saturation, intensity, etc.) to values of the second set of lighting values. Accordingly, the processor 140 may identify the second set of lighting values by identifying the first set of lighting values and the corresponding correlations within the lookup table.

The processor 140 may iteratively perform block 208 to chain multiple lookup tables together to convert the first set of lighting values to one or more intermediate set of lighting values and eventually to the second set of lighting values. Additionally, the multiple, chained lookup tables may include the calibration lookup table that is specific to each lighting assembly 104.

For example, the first set of lighting values in the first color space may be represented by element InputRGB. In certain embodiments, InputRGB may include the first set of lighting values in matrix form. The element InputRGB may be multiplied by element M1, which represents a lookup table for converting from the first color space to an intermediate color space (e.g., REC2020, REC709, ACES). The result is an intermediate set of lighting values represented as element Intermediate_RGB, as indicated by Equation 1 below, which may also be in matrix form.

$$\text{Intermediate\_}RGB = M1 \times \text{InputRGB} \quad \text{[Equation 1]}$$

Additionally, the intermediate set of lighting values may be multiplied by element M2, which represents an additional lookup table for converting from the intermediate color space to the second color space. The result is the second set of lighting values represented as element OutputRGB, as indicated by Equation 2 below, which may be in matrix form.

$$\text{OutputRGB} = M2 \times \text{Intermediate\_}RGB \quad \text{[Equation 2]}$$

In block 210, the processor 140 outputs the second set of lighting values to the lighting assembly 104. For example, the processor 140 may output control signal(s) to the lighting assembly 104 indicative of the second set of lighting values. In certain embodiments, the processor 140 may output individual control signals to each LED pixel assembly (see FIGS. 4 and 5) and/or each LED of the lighting assembly 104. For example, the second set of lighting values may include a specific light level (or series of sequential light levels) for each LED pixel assembly and/or each LED, such that the processor 140 is configured to determine and output a control signal indicative of each light level to the appropriate LED pixel assembly and/or LED. The second set of lighting values may enable a lighting output of the lighting system 102 to match the lighting output of a second lighting system (e.g., the backdrop 106, the alternative light source 136, the camera 108, or another lighting assembly/system) having a second pre-configured color space that is different from a first pre-configured color space of the lighting system 102.

FIG. 3 is a flow diagram depicting an embodiment of a method 300 for calibrating the lighting assemblies 104 of FIG. 1. For example, the method 300 may be performed during and/or after assembly of the lighting assemblies 104, during and/or after maintenance of the lighting assemblies 104, and at other suitable times. As explained in greater detail below, the method 300 may generally facilitate colorimetrically accurate light projection by the lighting assemblies 104. The method 300 is generally described below in reference to a single lighting assembly 104 but may be performed for multiple lighting assemblies 104 (e.g., the lighting assembly 104A, 104B, and/or 104C).

The method 300 may be performed by any suitable system that may control the lighting assembly 104, such as the controller 120. While the method 300 is described using steps in a specific sequence, it should be understood that the present disclosure contemplates that the described steps may be performed in different sequences than the sequence illustrated, and certain described steps may be skipped or not performed altogether. In some embodiments, the method 300 may be implemented by executing instructions stored in a tangible, non-transitory, computer-readable medium, such as the memory device 142, using a processor, such as the processor 140.

As illustrated, in block 302, the processor 140 outputs a baseline set of lighting values to the lighting assembly 104. The baseline set of lighting values may include predetermined light levels for each LED, each LED pixel assembly, and/or the lighting assembly 104 generally. In response to receiving the baseline set of lighting values, the lighting assembly 104 may emit (e.g., project) light. In certain embodiments, the baseline set of lighting values may be entered manually by an operator via the user interface 122 and/or initiated by the operator via the user interface 122.

In block 304, the processor 140 receives feedback indicative of light emitted (e.g., projected) by the lighting assembly 104. For example, the processor 140 may receive the feedback from light sensors (e.g., photodiodes) configured to sense light levels projected by the lighting assembly 104. Such light sensors may be included in the lighting assembly 104 (e.g., internal to the lighting assembly 104) or may be external to the lighting assembly 104. In certain embodiments, the lighting assembly 104, and/or the lighting system 102 generally, may include other mechanisms configured to provide the feedback indicative of light emitted by the lighting assembly 104.

In block 306, the processor 140 generates a calibration lookup table for the lighting assembly 104 based on the feedback. The calibration lookup table may adjust for any differences in the light that should be projected by the lighting assembly 104 and the light that is actually projected by the lighting assembly 104. For example, the LEDs and/or the LED pixel assemblies may not all project light as the same level when given same input. The calibration lookup table may account for such differences and enable the lighting assembly 104 to project an accurate representation of a lighting scheme.

In certain embodiments, the calibration lookup table may identify a lighting and/or a power adjustment for each LED and/or each LED pixel assembly of the lighting assembly 104. For example, the adjustment may be additional or less power that should be provided to the LED or LED pixel assembly to achieve a particular light level projected by the LED or LED pixel assembly. In certain embodiments, the calibration lookup table may be stored in the same memory and/or location as the lookup tables described above in reference to FIG. 2 (e.g., color space lookup tables). In some embodiments, the color space lookup tables described in reference to FIG. 2 may be chained with the calibration lookup table, such that the processor 140 may automatically reference both the calibration lookup table and the appropriate color space lookup table(s) when determining the second set of lighting values based on the color spaces and the first set of lighting values.

Figure 4:
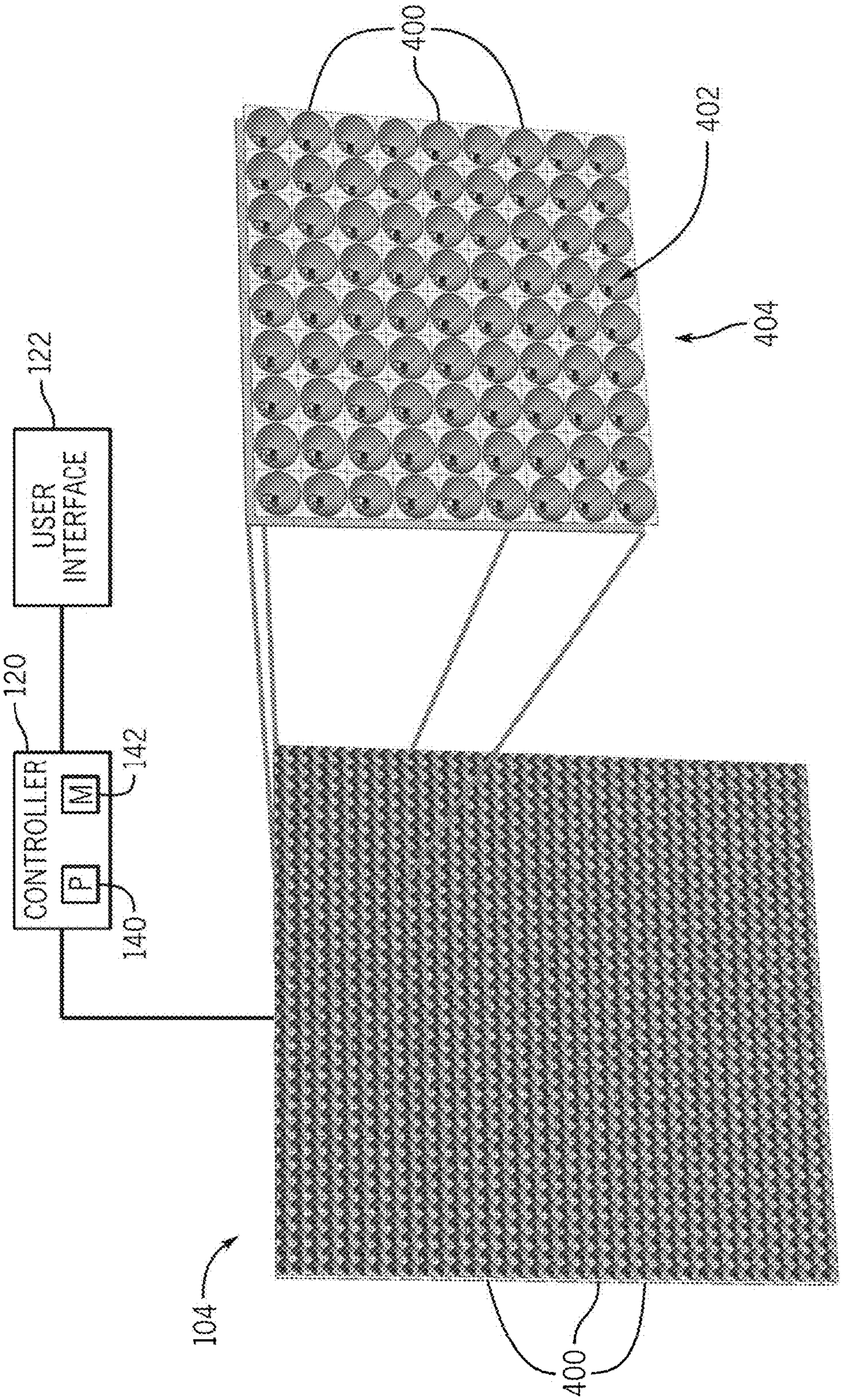
FIG. 4 is a perspective view of the lighting assembly and the controller of FIG. 1, in accordance with one or more current embodiments.

FIG. 4 is a perspective view of the lighting assembly 104 and the controller 120 of FIG. 1. As illustrated, the lighting assembly 104 includes arrays of LED pixel assemblies 400, with each LED pixel assembly 400 including LEDs 402. Each LED pixel assembly 400 is configured to project light outwardly based on a given set of lighting values. For example, each LED pixel assembly 400 may project/direct light toward a specific area, such as a specific area of the scene 101, more efficiently than traditional lighting systems that simply emit light toward a given target. Each LED pixel assembly 400 may be individually controlled to emit light at a particular color and white CCT. More specifically, the controller 120, via the processor 140, may determine the second set of lighting values to include a particular color and/or white CCT for each LED pixel assembly 400.

As illustrated, the LED pixel assemblies 400 are arranged in a grid of thirty-six LED pixel assemblies 400 by thirty-six LED pixel assemblies 400, such that the lighting assembly 104 of FIG. 4 includes 1296 total LED pixel assemblies 400. In certain embodiments, the lighting assembly 104 may include more or fewer LED pixel assemblies 400. Additionally, the LED pixel assemblies 400 are arranged into panels 404 with each panel 404 including eighty-one LED pixel assemblies 400 (e.g., nine LED pixel assemblies by nine LED pixel assemblies). In certain embodiments, each panel 404 may include more or fewer LED pixel assemblies 400. The panels 404 may be modular, such that the panels 404 may be connected to one another in any suitable configuration to form the lighting assembly 104. For example, as illustrated, the lighting assembly includes a square grid of four panels 404 by four panels 404 (e.g., sixteen total panels 404). In certain embodiments, the panels 404 may be coupled to one another to form a rectangular grid and/or to form other configurations. Additionally, while the illustrated embodiment of the lighting assembly 104 is generally flat, the lighting assembly 104 may be generally curved in some embodiments (e.g., some or all panels 404 of the lighting assembly 104 may be concave or convex).

In some embodiments, to provide power to the LED pixel assemblies 400, the controller 120 may reference an additional lookup table that provides a mapping between power units configured to provide power to the LED pixel assemblies 400 and the amount of light produced by the LED pixel assemblies 400. For example, the amount of light produced by the LED pixel assemblies 400 may depend on the amount of power provided to the LED pixel assemblies 400. The controller 120 may reference such a lookup table to determine the second set of lighting values used to control the lighting assembly 104. The controller 120 may reference this additional lookup table before or after the calibration lookup table discussed in reference to FIG. 3 to determine the second set of lighting values. In some embodiments, the controller 120 may reference this additional lookup table prior to referencing the color space lookup tables discussed in reference to FIG. 2. Each pixel assembly 400 of the lighting assembly 104 may be controlled via a particular amount of power, such as 0.5 watts (W), 1 W, 2 W, 5 W, 10 W, or other suitable amounts of power.

Figure 5:
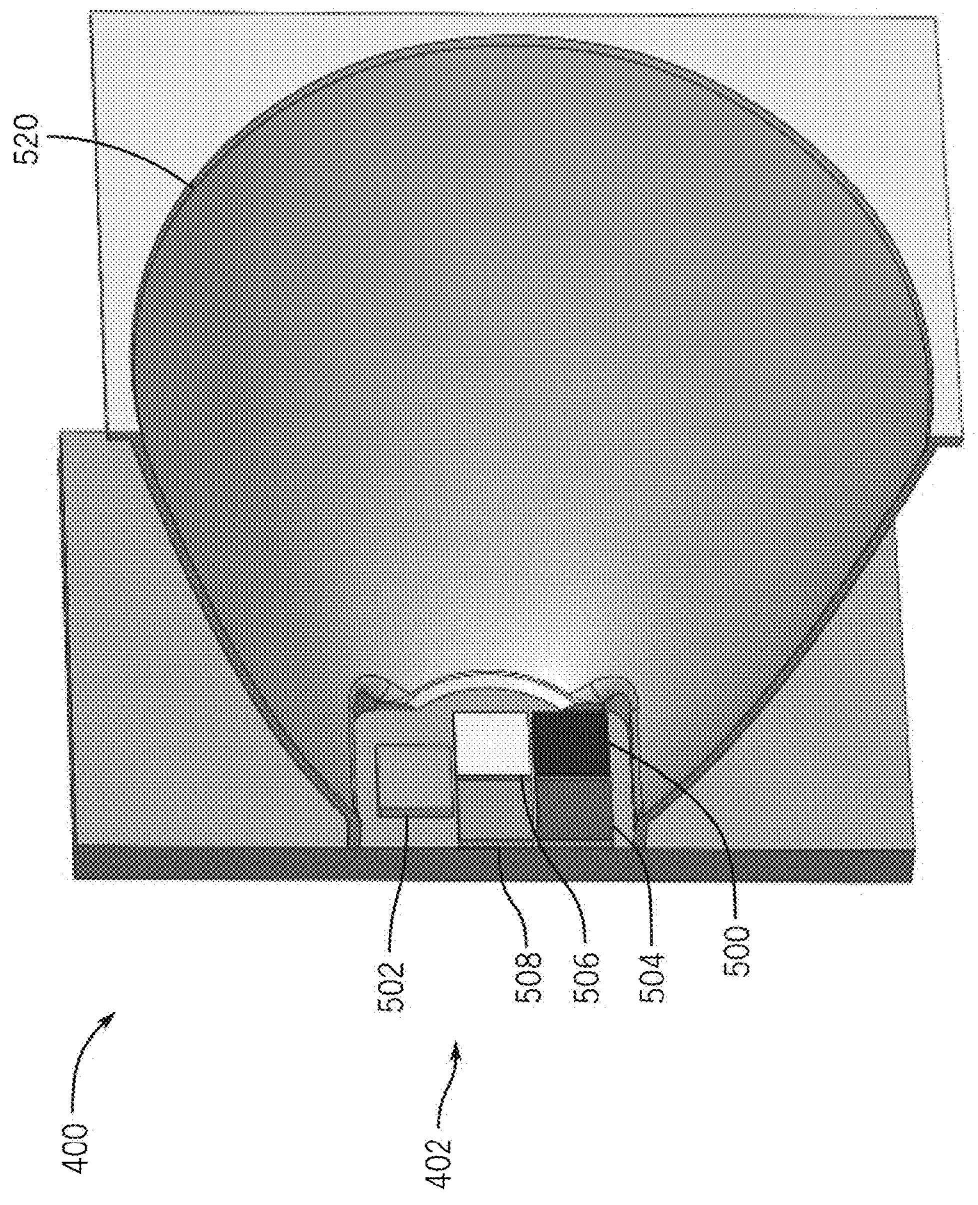
FIG. 5 is perspective cross-sectional view of an embodiment of a light emitting diode (LED) pixel assembly of the lighting assembly of FIG. 1, in accordance with one or more current embodiments.

FIG. 5 is perspective cross-sectional view of an embodiment of a light emitting diode (LED) pixel assembly 400 of the lighting assembly 104 of FIG. 4. As illustrated, the LEDs 402 of the LED pixel assembly include a red LED 500, a green LED 502, a blue LED 504, a 2700K white LED 506, and a 6500K white LED 508. In certain embodiments, the LED pixel assembly 400 may include more, fewer, and/or different LEDs 402. For example, in some embodiments, the 2700K white LED 506 or the 6500K white LED 508 may be omitted. Additionally or alternatively, each LED pixel assembly 400 may include white LED(s) of other CCTs (e.g., 3200K, 5600K, 6000K, etc.). In certain embodiments, the LEDs 402 may include LED(s) of different or additional colors, such as magenta, violet, and/or other suitable colors.

The LED pixel assembly 400 includes a reflector 520 configured to reflect and/or direct light emitted by the LEDs 402 outwardly, as illustrated in FIG. 5. The LED pixel assemblies 400 may be disposed generally at a center of the reflector 520. The reflector 520 may be any suitable material configured to reflect and/or direct light, such as steel, aluminum, and/or other suitable materials. In certain embodiments, the reflector 520 may be a heat sink configured to absorb heat and transfer the heat to a panel backing coupled to multiple LED pixel assemblies 400 (e.g., some or all LED pixel assemblies 400 of a given panel 404 and/or some or all LED pixel assemblies 400 of the lighting assembly 104 generally).

In certain embodiments, the controller 120 may determine and/or adjust the second set of lighting values based on the specific makeup of the LEDs 402. For example, in the illustrated embodiment of the red LED 500, the green LED 502, the blue LED 504, the 2700K white LED 506, and the 6500K white LED 508, the controller 120 may determine the second set of lighting values to include a red light level to be emitted by the red LED 500, a green light level to be emitted by the green LED 502, a blue light level to be emitted by the blue LED 504, and a white CCT to be achieved by the 2700K white LED 506 and the 6500K white LED 508.

In some embodiments, the input received by the controller 120 (e.g., the first set of lighting values) may specify only red, green, and blue light levels, and the controller 120 may determine an adjusted red light level to be emitted by the red LED 500, an adjusted green light level to be emitted by the green LED 502, an adjusted blue light level to be emitted by the blue LED 504, and the white CCT to be achieved by the 2700K white LED 506 and the 6500K white LED 508 based on the input. For example, the controller 120 may determine a white light value (e.g., the white CCT) as a minimum of the red light value, the green light value, and the blue light value. The controller 120 may then determine the adjusted red light value as the input red light value minus the white light value. Additionally, the controller 120 may determine the adjusted green light value as the input green light value minus the white light value. Further, the controller 120 may determine the adjusted blue light value as the input blue light value minus the white light value. Accordingly, the second set of lighting values may include an adjusted red light value, an adjusted green light value, an adjusted blue light value, and a white CCT for each LED assembly 400 of the lighting assembly 104.

Figure 6:
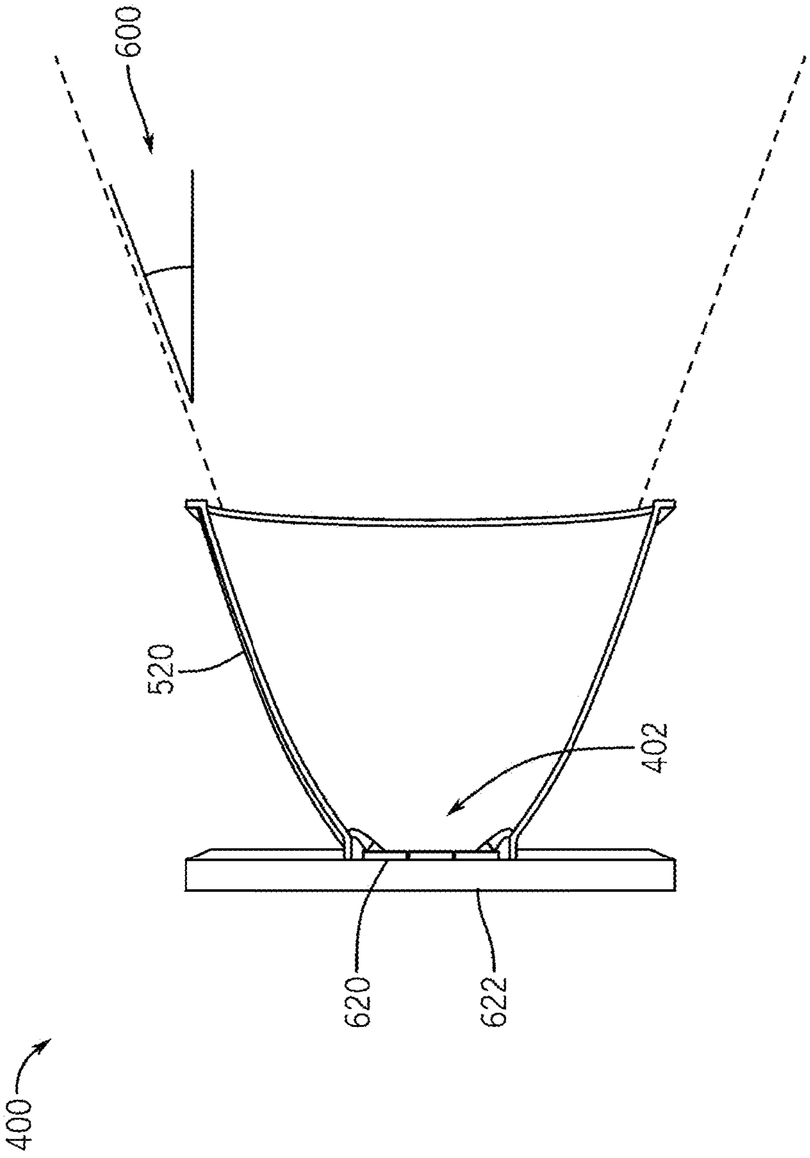
FIG. 6 is a side cross-sectional view of the LED pixel assembly of FIG. 5, in accordance with one or more current embodiments.

FIG. 6 is a side cross-sectional view of the LED pixel assembly 400 of FIG. 5. The reflector 520 is configured to achieve a beam angle 600 of the light emitted by the LEDs

402. The beam angle may be any suitable beam angle, such as between 15 degrees and 75 degrees, between 20 degrees and 60 degrees, between 20 degrees and 45 degrees, between 30 and 35 degrees, between 25 and 40 degrees, between 25 and 35 degrees, between 25 degrees and 30 degrees, and other suitable angles. In the illustrated embodiment, the beam angle 600 may be between 30 and 35 degrees. In certain embodiments, the reflector 520 of each LED pixel assembly 400 may be replaced to achieve other beam angles, such as any of the beam angles listed above.

As illustrated, the LEDs 402 are electrically and mechanically coupled to a printed circuit board (PCB) 620. The PCB 620 may provide power to and facilitate control of the LEDs 402. Additionally, the PCB 620 and the reflector 520 are coupled to a panel 622, which may be a heat sink configured to absorb and dissipate heat generated by the LEDs 402. For example, the panel 622 may absorb heat from the LEDs 402, the reflector 520, and/or the PCB 620 and dissipate the heat to air. In certain embodiments, the lighting assembly 104 may include a radiator, a fan, and/or other suitable heat transfer mechanism(s) configured to facilitate cooling of the LED pixel assemblies 400.

Figure 7:
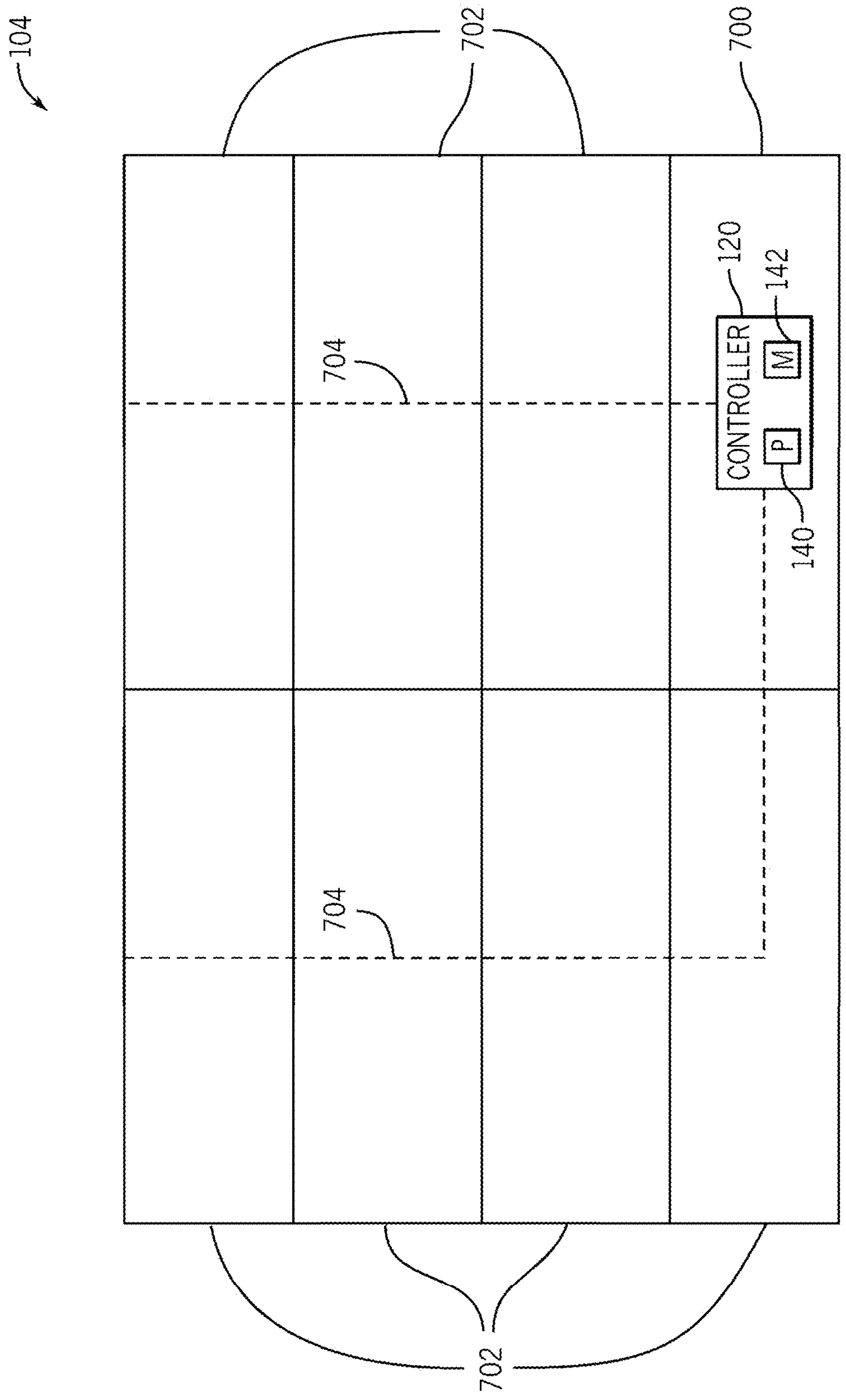
FIG. 7 is a perspective view of the multiple lighting assemblies including a leader lighting assembly and follower lighting assemblies.

FIG. 7 is a perspective view of multiple lighting assemblies 104 including a leader lighting assembly 700 and follower lighting assemblies 702. The multiple lighting assemblies 104 may be coupled to one another to form a larger, modular array of lighting assemblies 104. As illustrated, the leader lighting assembly 700 includes the controller 120, and the follower lighting assemblies 702 do not include the controllers 120. The controller 120 positioned in the leader lighting assembly 700 may be configured to control the follower lighting assemblies 702 (e.g., the leader lighting assembly 700 may lead the follower lighting assemblies 702, and the follower lighting assemblies 702 may follow the leader lighting assembly 700) via wired communications 704 and/or via wireless communications. In some embodiments, one or more of the follower lighting assemblies 702 may include a controller, such as a controller that communicates with the controller 120 of the leader lighting assembly 700. Additionally, as illustrated, the multiple lighting assemblies 104 includes seven follower lighting assemblies 702. In other embodiments, the multiple lighting assemblies 104 may include more or fewer follower lighting assemblies 702 (e.g., one, two, three, four, five, six, eight, nine, ten, twelve, fifteen, twenty, forty, one hundred follower lighting assemblies 702).

The controller 120 of the leader lighting assembly 700 may receive an input signal indicative of input set(s) of lighting values, such as the input signal described in reference to block 202 of FIG. 2. Based on the input signal, the controller 120 may determine the second set of lighting values to be emitted by the leader lighting assembly 700 and each respective follower lighting assembly 702. For example, the controller 120 may map the input set of lighting values to the second set of lighting values for each respective follower lighting assembly 702 based on color space lookup table(s) and a calibration lookup table that is specific to the respective follower lighting assembly 702. Accordingly, the single controller 120 may individually control each of the multiple lighting assemblies 104 included in the array.

Figure 8:
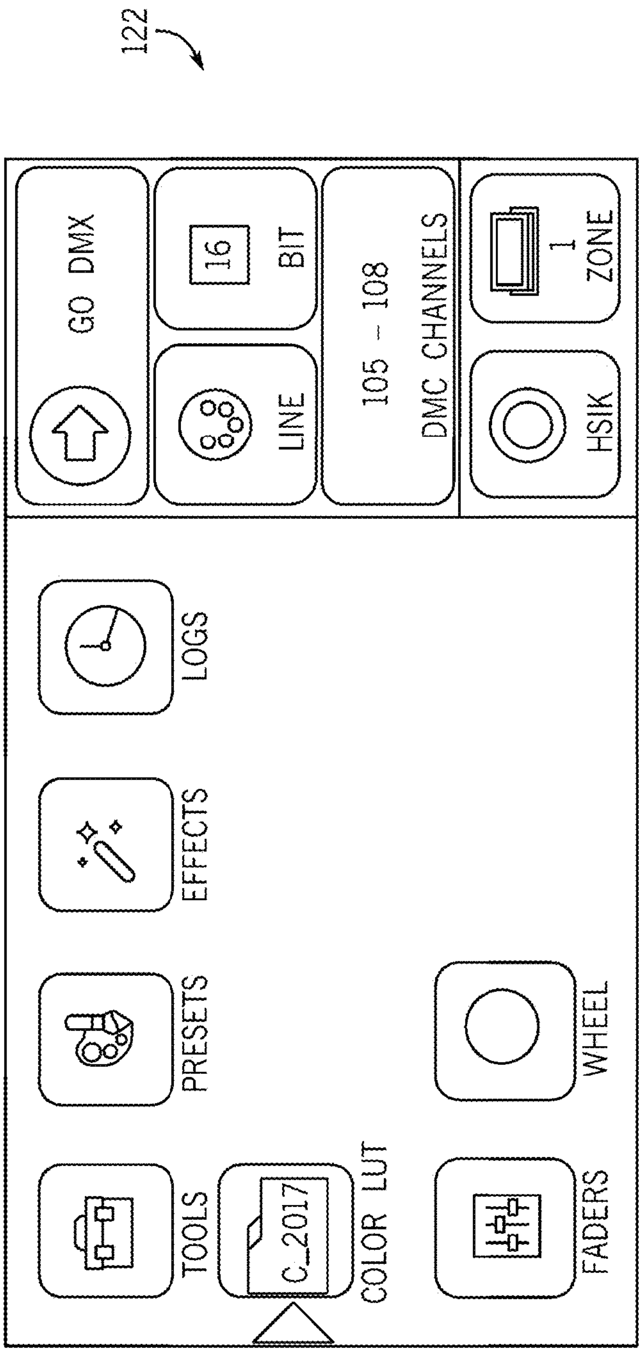
FIGS. 8-10 are schematic diagrams of embodiments of a graphical user interface (GUI) configured to enable control of the lighting assembly of FIG. 1, in accordance with one or more current embodiments.

FIG. 8 is a schematic diagram of an embodiment of the user interface 122 configured to enable control of the lighting assembly 104 of FIG. 1. As illustrated, the user interface 122 is a GUI configured to enable user interaction with the lighting system 102. For example, the GUI may facilitate user selection of a particular lighting assembly 104, control of the lighting assembly 104, selection of a desired set of lighting values and/or a desired color space, and other interactions. In the illustrated embodiment of FIG. 8, the user may select a particular color space lookup table from a library of color space lookup tables (labeled as "Color LUT" in the GUI). Additionally, a user may interact with selectable options for control via DMX, control via HSIK (hue, saturation, intensity, temperature), and control a particular zone.

Figure 9:
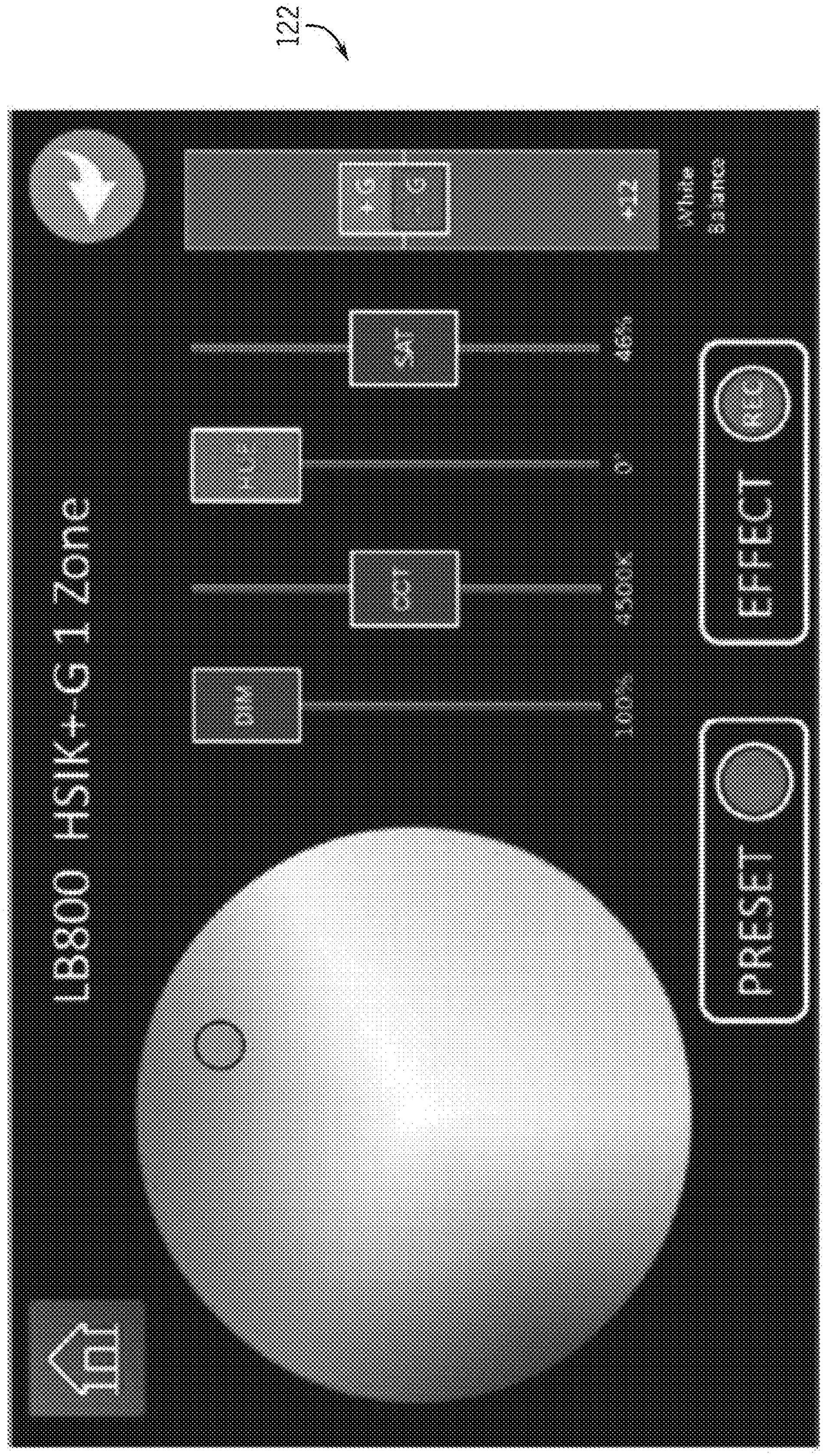

FIG. 9 is a schematic diagram of another embodiment of the user interface 122 configured to enable control of the lighting assembly 104 of FIG. 1. In the illustrated embodiment, the user interface 122 is a GUI configured to enable user interaction and control of certain lighting parameters, such as a hue value, a saturation value, an intensity value, and a white CCT value. As illustrated, each value may be adjusted via sliders. In certain embodiments, the GUI may include other adjustment mechanisms, such as drop down menu(s) and/or entry field(s) for such values.

In certain embodiments, a particular set of lighting values (e.g., a first set of lighting values) and a color space may be selected and/or determined, such as by a user via the user interface 122 or based on a planned/programmed sequence of sets of lighting values. Prior to and/or during projection of the particular set of lighting values (or an adjusted set of lighting values (e.g., a second set of lighting values determined based on the first set of lighting values and the color space)), a user may interact with the user interface 122 to adjust the set of lighting values. For example, in the illustrated embodiment, the user may adjust the hue value, the saturation value, the intensity value, and/or the white CCT of the set of lighting values.

In some embodiments, the user may make different adjustments for different versions of the set of lighting values. For example, the user may make a first adjustment for a first version of the set of lighting values, a second adjustment for a second version of the set of lighting values, a third adjustment for a third version of the set of lighting values, and a fourth adjustment for a fourth version of the set of lighting values, such that there are four different versions of the set of lighting values. The lighting assembly 104 may be configured to project each version in subsequent frames captured by the camera 108 of FIG. 1, such that every four frames captures each of the four versions of the set of lighting values. The frames for each version may then provide a different version of film captured by the camera 108 (e.g., each version of film may include different lighting). As such, the GUI and the lighting assembly 104 may enable a user to make multiple, different modifications to a given set of lighting values and view the different end results in the captured film.

Figure 10:
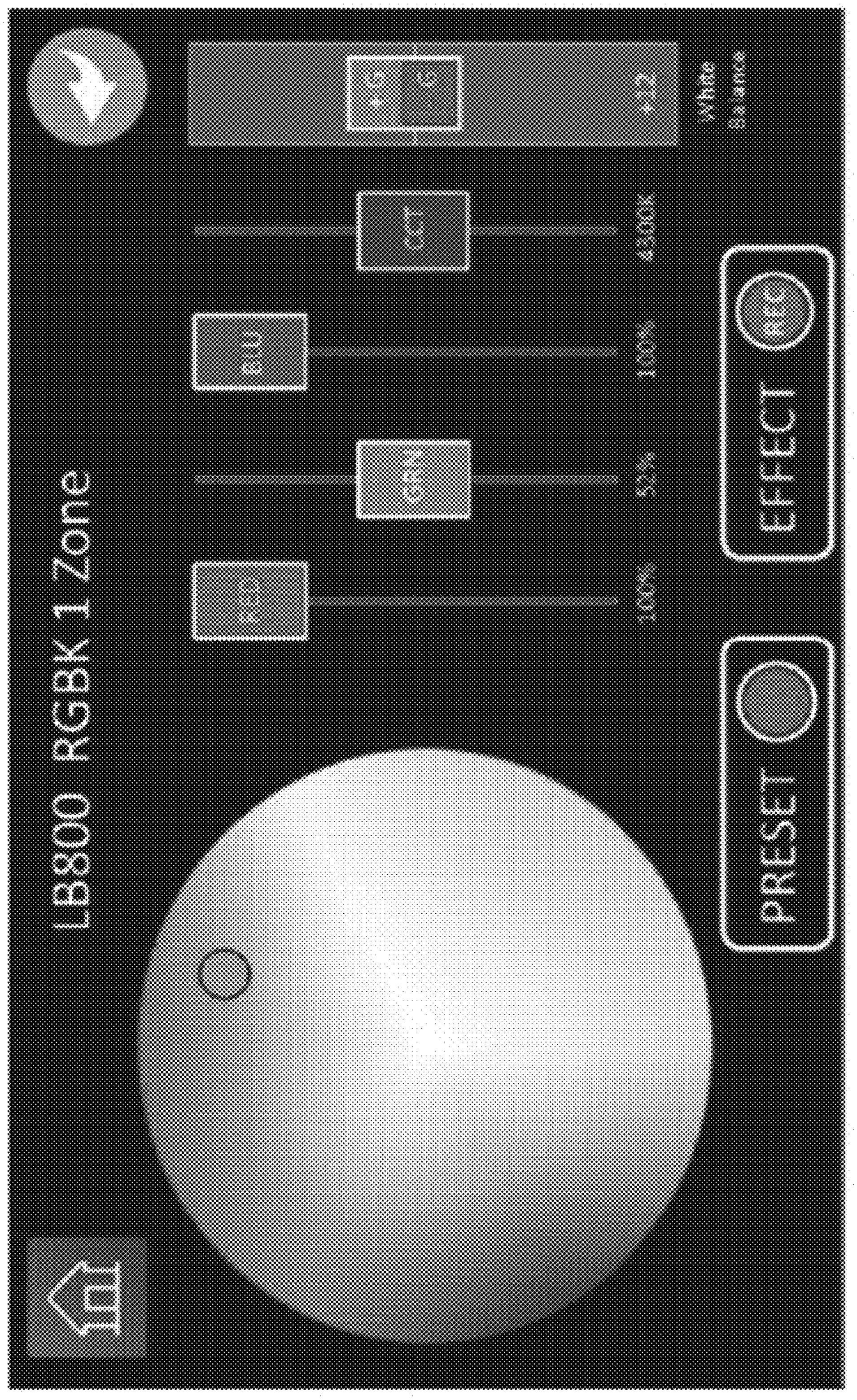

FIG. 10 is a schematic diagram of another embodiment of the user interface 122 configured to enable control of the lighting assembly 104 of FIG. 1. In the illustrated embodiment, the user interface 122 is a GUI configured to enable user interaction and control of certain lighting parameters, such as a red light value, a green light value, a blue light value, and a white CCT value. For example, the user may adjust the red light value, the green light value, the blue light value, and/or the white CCT of the set of lighting values (e.g., a selected and/or preset/programmed set of lighting values). Additionally, as illustrated, each value may be adjusted via sliders. In certain embodiments, the GUI may include other adjustment mechanisms, such as drop down menu(s) and/or entry field(s) for such values.

By making digital color lighting instruments with selectable LUTs, such digital color lighting instruments could now be correlated to different digital color devices like LED screens, cameras, and other brands or types of digital color lights and color standards. This improves lighting efficiency and accuracy as well as post-production processing time and effort. For example, under current post-processing steps, it is frequently necessary to spend many hours just trying to color grade multiple sources of image data (different cameras, locations and sets) to get them to the same look. This becomes an even bigger challenge when combining digital screens and/or special effects with live footage. Having predictable, correlated color between all image input devices including the lighting can make this process much more efficient and predictable. It also improves the quality of the digital images that are archived by avoiding clipping (the loss of data in highlights, shadows, and saturated color).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A lighting system comprising:
- a controller comprising a processor and a memory, wherein the processor is configured to:
  - receive a first set of lighting values in a standard color space;
  - map the first set of lighting values to an additional color space associated with a particular digital device to generate a second set of lighting values, wherein the particular digital device comprises a lighting assembly configured to illuminate a scene, a backdrop configured to display one or more images, video content, or both, within the scene, or a camera configured to capture the scene; and
  - provide an output indicative of the second set of lighting values to the particular digital device.

2. The lighting system of claim 1, wherein the first set of lighting values comprises a red light value, a green light value, and a blue light value, and wherein the second set of lighting values comprises a white light value as a white color correlated temperature, an adjusted red light value, an adjusted green light value, and an adjusted blue light value.

3. The lighting system of claim 2, wherein the processor is configured to:
- determine the white light value as a minimum of the red light value, the green light value, and the blue light value;
- determine the adjusted red light value as the red light value minus the white light value;
- determine the adjusted green light value as the green light value minus the white light value; and
- determine the adjusted blue light value as the blue light value minus the white light value.

4. The lighting system of claim 1, wherein the processor is configured to receive an indication of the first set of lighting values, an indication of the standard color space, or both, via a graphical user interface (GUI).

5. The lighting system of claim 4, wherein the processor is configured to:
- provide the output indicative of the second set of lighting values to the GUI; and
- receive a modification to the second set of lighting values via the GUI.

6. The lighting system of claim 5, wherein the modification to the second set of lighting values comprises an adjustment to a hue value, a saturation value, an intensity value, a white color correlated temperature (CCT) value, or any combination thereof.

7. The lighting system of claim 1, wherein the processor is configured to determine the additional color space based on a makeup of light emitting diodes (LEDs) of the particular digital device.

8. The lighting system of claim 1, comprising a leader lighting assembly, wherein the leader lighting assembly comprises the controller, and wherein the controller is configured to control each follower lighting assembly of one or more follower lighting assemblies.

9. The lighting system of claim 8, wherein the controller is configured to:
- determine a respective set of lighting values based on a lookup table (LUT) specific to each respective follower lighting assembly of one or more follower lighting assemblies; and
- output the respective set of lighting values to each respective follower lighting assembly of one or more follower lighting assemblies.

10. The lighting system of claim 9, wherein the LUT comprises a color space LUT specific to each respective follower lighting assembly.

11. The lighting system of claim 9, wherein the LUT comprises a calibration LUT specific to each respective follower lighting assembly.

12. The lighting system of claim 8, wherein the leader lighting assembly is communicatively coupled to the one or more follower lighting assemblies.

13. A method of controlling a digital device, comprising:
- receiving a first set of lighting values in a standard color space;
- mapping the first set of lighting values to an additional color space associated with the digital device to generate a second set of lighting values, wherein the digital device comprises a lighting assembly configured to illuminate a scene, a backdrop configured to display one or more images, video content, or both, within the scene, or a camera configured to capture the scene; and
- providing an output indicative of the second set of lighting values to the digital device.

14. The method of claim 13, wherein the first set of lighting values comprises a red light value, a green light value, and a blue light value, and wherein the second set of lighting values comprises a white light value as a white color correlated temperature, an adjusted red light value, an adjusted green light value, and an adjusted blue light value.

15. The method of claim 14, comprising:
- determining the white light value as a minimum of the red light value, the green light value, and the blue light value;
- determining the adjusted red light value as the red light value minus the white light value;

determining the adjusted green light value as the green light value minus the white light value; and determining the adjusted blue light value as the blue light value minus the white light value.

16. The method of claim 13, comprising receiving an indication of the first set of lighting values, an indication of the standard color space, or both, via a graphical user interface (GUI).

17. The method of claim 16, comprising:

providing the output indicative of the second set of lighting values to the GUI; and receiving a modification to the second set of lighting values via the GUI.

18. The method of claim 13, comprising determining the additional color space based on a makeup of light emitting diodes (LEDs) of the digital device.

* * * * *